Nov. 15, 1938.　　　　　　J. J. RYAN　　　　　　2,136,759
VIBRATION INSTRUMENT
Filed April 20, 1934　　　4 Sheets-Sheet 1

INVENTOR
James J. Ryan,
By Fisher Pedersen,
Attorneys.

Nov. 15, 1938.  J. J. RYAN  2,136,759
VIBRATION INSTRUMENT
Filed April 20, 1934    4 Sheets-Sheet 2

INVENTOR
James J. Ryan,
by Fisher Pedersen,
Attorneys

Nov. 15, 1938.  J. J. RYAN  2,136,759
VIBRATION INSTRUMENT
Filed April 20, 1934   4 Sheets-Sheet 4

INVENTOR
James J. Ryan,
By Fisher Pedersen,
Attorneys.

Patented Nov. 15, 1938

2,136,759

UNITED STATES PATENT OFFICE 2,136,759

VIBRATION INSTRUMENT

James Jay Ryan, Minneapolis, Minn.

Application April 20, 1934, Serial No. 721,576

10 Claims. (Cl. 73—51)

My invention relates to vibration instruments, and it has particular relation to vibration instruments which indicate and record vibrations of machines and structures.

The present invention more specifically relates to vibration instruments useful in connection with the analysis of vibrations in machines and structures wherein periodically pulsating forces and torques set up vibrations which may be so destructive or highly undesirable in character as to require suppression.

It was early recognized that the seismic suspension of a weight with a suitable mechanical medium would graphically indicate vibrational phenomena, and that a series of connecting levers between a vibrating object and a rigid body would describe the motion of the vibrating object. The problem involved is one of analysis of the motion or vibration; that is, the determination of the amplitude of movement, the vibration path or wave form, and the time element or frequency.

In view of the fact that the magnitude of the vibrations usually encountered in machines and allied structures is extremely small, it is difficult for mechanical mechanisms to magnify movements sufficiently for convenient interpretation. It has also been observed that where mechanical means are employed to translate movements to a recording mechanism, heavy seismic weights with attending heavy instrument framework are necessary to overcome the friction and inertia of the connecting parts, resulting in a heavy, cumbersome, stationary instrument.

Several instruments have been devised for determining the vibration characteristics of machinery. Most of these are useful only for investigating a single phase of the vibratory motion; the frequency of the vibration, or the amplitude of motion, or the time-space function of the movement. Others may be classed as the laboratory type, having the ability to present a microscopic record of the vibration, but so expensive and cumbersome to use as to prohibit their general adoption. Due to the limited number of laboratory instruments available, the importance of the usual methods of analysis of complete records in the solution of vibration problems has not been generally recognized. If complete data on a series of vibration tests can be recorded in a systematic manner, the fundamental methods of vibration analysis may be employed with remarkable success.

In my research for the development of an applicable type of vibration instrument, I have constructed an instrument for analyzing mechanical vibrations which will not only indicate the vibrating movements magnified to a greater degree, but will also record them for immediate and convenient interpretation. Since this instrument does not transmit movements through a mechanical mechanism to the recording device, an instrument light in weight and readily portable is obtained.

It is therefore an object of the present invention to provide an instrument for indicating, recording and analysing torsional or transverse vibratory motion suitable for general use and capable of furnishing complete data of a fundamental nature.

Another object is to provide an instrument of this type having laboratory accuracy, a large range of flexibility for application to the general vibration problems encountered in industry and one which is, at the same time, light in weight, small in size, as well as simple and convenient in operation.

A further object of my invention is, therefore, to provide a vibration instrument that will visually indicate and record amplitude, wave form, cycle position and frequency of transverse and torsional vibrations of machines and structures.

It is also an object of my invention to provide a vibration instrument comprising the combination of a mechanical system and an optical system having a high degree of magnification of the external vibration to be analyzed for attending immediate and convenient interpretation.

Another object is to eliminate to a large extent the heavy seismic weights and connecting mechanical mechanism by the use of a mechanical-optical system to obtain a light, portable instrument without sacrificing sensitiveness or accuracy.

Additional objects include the provision of seismographic elements for receiving general, direct, or torsional vibrations and transferring such vibrations to indicators or recorders for analysis, as well as a unitary instrument including one or more of such seismic elements depending upon the particular vibration problems presented.

Other objects of my invention relate to the details of construction of vibration instruments whereby the size and weight of the instruments are maintained at a minimum, and the required accuracy and simplicity of operation are obtained.

These and other objects which will be apparent from the sequent description are all embraced within my invention hereinafter more specifically described in connection with a preferred embodiment which is illustrated in the accompanying drawings, wherein—

The invention in its broadest aspects includes the provision of a vibration instrument readily constructed for analyzing mechanical vibrations which will not only magnify the vibrating movements to a high degree, but will also record them for immediate and convenient interpretation. The instrument does not employ mechanical elements to transmit movements to the recording device and therefore an instrument light in weight and readily portable is obtained.

Several elements are involved in the mechanical system of the vibration instrument forming a part of the present invention. They include a seismic element for indicating transverse vibrations, a direct follow element, a seismic element for indicating torsional vibration, and a timing element. These elements, responsive to transverse or torsional vibrations, alter the position of small mirrors which project a beam of light onto a viewing screen after passing through an optical system which may comprise a condensing lens and a stroboscopic element.

The several vibration responsive elements referred to in the preceding paragraph are adapted to be connected either singly to the device whose vibration is being measured, or more than one of these elements may be simultaneously connected to said device, in order that simultaneous readings may be obtained on the viewing screen in their true phase relationship to each other. Furthermore, this relationship may be studied in comparison with a standard known time wave, so that the frequency of the vibrations being measured may be readily obtained. All three of the vibration responsive elements, namely, the seismic element, direct follow element, and torsional seismic element, may be simultaneously connected to various vibrating parts of a given machine and so the three vibration curves produced by the responsive elements enumerated above can be viewed on the viewing screen in their phase relationship with respect to each other, and in comparison with a standard time curve.

The mechanical elements of the instrument are individually limited to movement with one degree of freedom. Thus a vibrating body will cause the elements to move in one line of action only, this line being the component in one direction of all motion of the body. Usually the wave path of a vibration, when constrained to a single direction of movement, takes the form of simple harmonic motion, represented by the sine curve. Such a curve offers the least difficulty in graphical analysis, since all variations from the sinusoidal motion, especially in steady state vibration phenomena, may be broken up into a fundamental sine wave and its harmonics. The mechanical movement thus initiated by the vibrating body is observed as a sinusoidal type of motion on the optical recording system.

In the indication displayed on the viewing screen, the extreme displacement of the curve is recognized as being proportional to twice the amplitude, or the total movement, of the vibration. Intermediate values of displacement of the harmonics of the wave may also be noted. The shape of the wave form, important particularly where the harmonic structure is complex, or the outline "sharp" as under repeated impact conditions, is reproduced. The frequency of the vibration of the wave motion is determined by comparison on the screen with a standard sine wave having a known frequency.

By the isolation of the movement into single phase displacements the analysis of the vibration is reduced to its most elemental form. Systematic recording of the data with regard to definite directions of motion of the body gives complete knowledge of the characteristics of the vibration, and permits a scientific analysis of the action on the body necessary to produce the disturbance.

The vibration instrument forming a part of my invention is, for purposes of convenience in reference, designated as an oscillo-vibrograph. It comprises, in its broader aspect, a source of light emanating from a limited area or point which is reflected by a mirror, controlled by a seismic, torsional, or follow mechanism, onto a viewing screen. The several types of mechanical elements above considered may all be employed in conjunction with my oscillo-vibrograph or one or more may be combined with the optical system, depending upon the uses to which a particular instrument will be put. They are generally but not necessarily used independently and under particular circumstances, depending upon the character and source of the vibration or the position on the vibrating body which is most accessible to the investigator.

In connection with the mirrors used with the seismic elements, a timing element is also provided which, with its reflecting mirror, also projects a beam of light upon the viewing screen for purposes of comparison with the beam of light projected onto the screen in acccord with the character and amplitude of the vibration under analysis.

The entire vibration analyzing mechanism may be conveniently and practically arranged within the confines of a relatively small case or, when using the direct follow mechanism or the torsional element, the seismographic element is mounted on the outside of the case for ready access to the vibrating body. The optical system, including the source of light, the vibrating mirrors, a condensing lens, a rotating polygon of mirrors or, optionally, an oscillating mirror in conjunction with a shutter, and the ground glass viewing screen, is within the enclosing case, as well as the electrical and mechanical controls for the various elements provided with switches and dials on the outside. All reflective surfaces within the case not within the optical system are preferably painted or otherwise coated with a non-reflective material to prevent undesirable beams of light.

The exterior of the case is provided with suitable projections or other convenient means for attaching the case as a whole to either a vibrating body, when the transverse vibration seismic element is being employed, or to a stationary body, when measuring with the torsional element or the direct follow element.

The seismic element consists of a frame having a shaft extension on which is mounted a mass capable of angular movement on a ball bearing assembly. A spiral spring or other suitable means maintains the mass at any desired position.

When the mass is subjected to a vibratory motion, it remains stationary due to its inertia, and relative movements between the supporting structure and the mass are obtained. The instrument case, carrying the structure as an integral part, is thus subjected to the movement of the external vibration. A lever, interposed between the structure and the mass, activates a pivoted bar that is free to oscillate. A small rectangular mirror on the end of the bar, when vibrated through an angle, reflects a beam of light to give a proportional displacement on the optical screen. The frequency of operation is above the natural period of free vibration of the element.

Provision is made on the case for the attachment alternatively of either a direct follow mechanism or a torsional seismic element, both of which may operate through the same interior mechanism to oscillate the reflecting mirror.

The direct follow element includes a bell crank attached to a clamping ring engageable with the outside of the case. A rod extending from the bell crank, into the interior of the case engages through a yoke a small bar supporting a mirror. This bar may be an extension of a block pivoted in the rigid structure fixed to the instrument case. The lines of centers of the two bars or pivots are offset longitudinally to impart oscillations of the rod to the mirror. A coil spring on the rod maintains mechanical contact between the element and the bell crank during vibration. Vibration is imparted to the direct follow element through the bell crank by means of a relatively light, rigid bar which may be contacted with the bell crank at any point along the projecting end of the lever according to the degree of magnification desired.

The instrument case is freed of the external vibrations to be measured by placing it upon a rigid mounting, or by supporting it upon a spring-borne body of considerable mass. The relative movement between the vibrating object and the instrument case is transmitted through the bell-crank to a rod having a pivoting connection to a small pivoted bar capable of translating the axial movement of the rod into angular motion. The small mirror on the end of the bar functions, in reflecting a beam of light, as in the case of the seismic element above.

A torsional seismic element may be attached by a cylindrical plate to the side of the instrument case in place of the bell crank clamping ring of the direct follow element or a separate mounting and indicating mechanism may be provided. A shaft extending from the plate supports, through a ball bearing assembly, a U-shaped cylindrical shell consisting of an inner cylinder, a backing disc and an outer cylindrical pulley drive. Disposed within the shell is a ball bearing assembly carrying an essentially heavier cylinder capable of rotation independent of the shell. The connection between the heavier cylinder and the shell is a flexible one secured through the use of a spiral spring. Over the assembly and attached to the pulley drum is a cover face plate. Relative angular movement of the cylinder and the shell is transmitted by means of a series of two bell-cranks, pivoted on a ring attached to the inner cylinder of the shell and activating a rod extending through the central shaft which contacts with the same rod described in connection with the direct follow element. The torsional vibration element is connected to the rotating element under analysis by means of a semi-flexible belt, preferably one which is, for all practical purposes, non-elastic, as, for example, a thin metallized belt, arranged over the outside of the pulley drum and driving the torsional element when connected to an external rotating shaft.

The seismic element for indicating torsional vibrations is, when connected to an external rotating shaft, subject to torsional oscillation by means of the semi-flexible belt. The belt and the pulley drum follow the oscillation of the shaft, while the seismic weight continues at constant angular velocity. The relative angular displacements of the drum and weight act through a pair of bell-cranks upon the direct follow element mechanism to transform the angular movements into wave motion on the viewing screen.

In order to assist in the analysis of the vibrations projected upon the viewing screen, a timing element is provided. A suitable element of this character includes a rack supported in guides carrying a member to which is attached a projecting cantilever beam spring having at the outer end a weighted body of magnetic material carrying a small rectangular mirror. The beam spring is carried in guides and may be clamped rigidly in position by a small block. The period of vibration of the timing element is controlled by changing the free length of the cantilever beam spring wherein the block supported on the rack is moved longitudinally with the cantilever beam spring by means of a shaft extending through the instrument case to a dial adjustment. A screw fastens the cantilever by means of a clamping block in the desired position and an electromagnet, located beside the beam spring, displaces the weighted body when energized.

To locate definite positions on the shafts, etc., an electromagnetic device may be provided as a position indicator or contact marker. It includes an electromagnet operating a pivoted rod carrying a mirror, whereby a continuous line is projected on the viewing screen, broken only by a sharp V-wave at the point of contact.

In order to make a permanent record of the projections onto the viewing screen, a camera for photographic recording may be provided. This includes a box enclosing a sensitized film supported upon spools and guide rollers over a curved plate of the same shape as the viewing screen. The camera may be used either with the rotating mirrors or by locking the mirrors in position and moving the film synchronously over the viewing screen.

Figures 1, 14, 15:
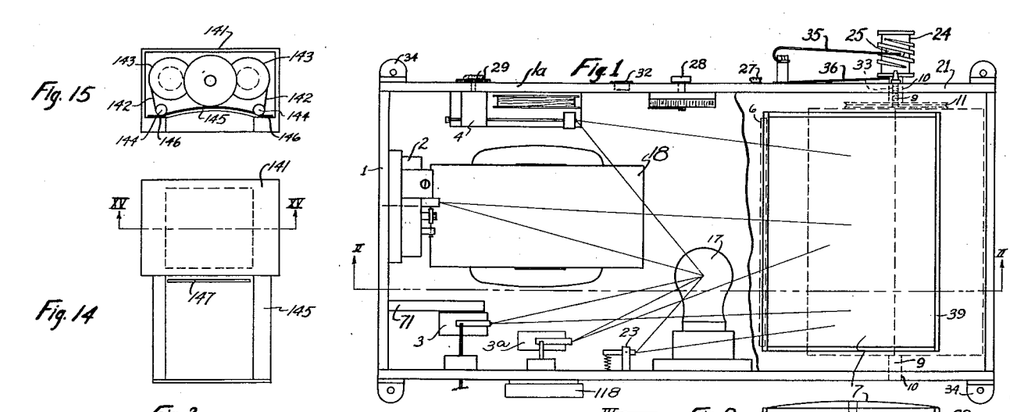
Figure 1 is a top view of one of the vibration instruments showing a general assembly of the instrument made according to my invention with the cover plate partly cut away.
Figures 14 and 15 are end views of a camera attachment for optical recording.
Figure 2:
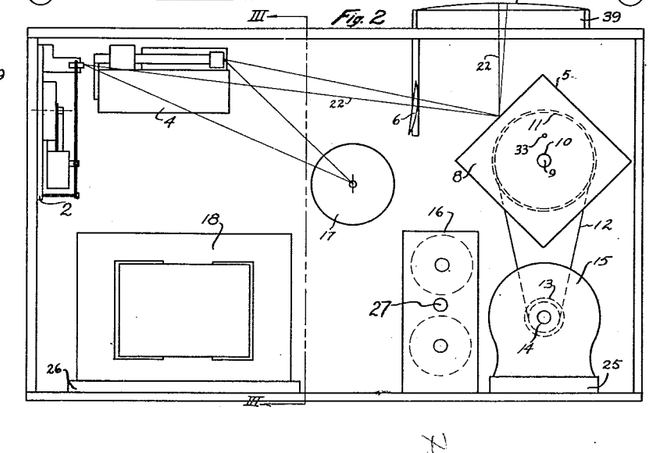
Figure 2 is a sectional view of the instrument along the line II—II of Fig. 1, looking in the direction of the arrows.
Figure 3:
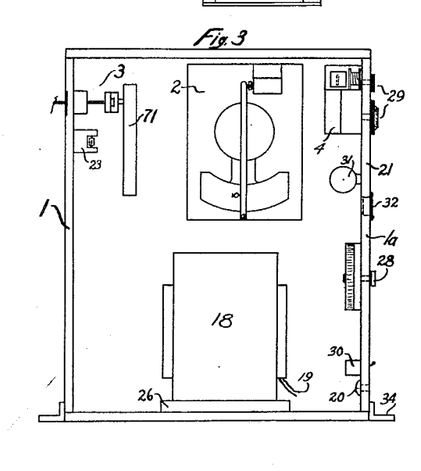
Figure 3 is a sectional view of the instrument taken along the line III—III of Fig. 2, also looking in the direction of the arrows.

Considering the invention more specifically, attention is directed to the drawings, in which is illustrated one of the specific modifications in which my invention has been embodied and by means of which it may be explained. In Figure 1, which is a plan view of the general assembly, reference numeral 1 refers to the housing, frame or case within which several of the units comprising the oscillo-vibrograph are placed and the sides or panels of which are employed as mountings for switches, dials, rheostats, etc., which may thereby be conveniently operated and adjusted without disturbing the interior of the unit. Figures 2 and 3 are side and sectional views, respectively, of the general combination. Within case 1 the vibrating elements, the timing mechanism and the position indicator, are mounted at one end. At an intermediate point the source of light is positioned and at the end opposite from the vibrating elements may be found the indicating mechanism including the polygon of mirrors and the ground glass viewing screen. The seismic mechanism or element 2 is mounted at approximately the center laterally of one end of the case 1, but at a position relatively near the top of that end. Near the same end but on one side is the direct indicating mechanism or element 3 and on the opposite side a timing mechanism or element 4. On the same side of casing 1, located between the direct indicating element 3 and the position indicator 23, is a torsional seismic element 3a. On the same side as the direct indicating element 3, which is used in connection with both the folow mechanism and the torsional vibration element, is a position indicator 23. These several elements or mechanisms are provided with reflecting mirrors which face a source of light preferably emanating from a single point within the light bulb 17. The rays of light reflected by the mirrors are projected through a condensing lens 6 onto the surface of the polygon of mirrors 5 mounted on a shaft 9 rotating in bearings 10 at the opposite sides of the case 1. The polygon of mirrors is rotated by means of a pulley 13 on a motor 15 which is connected with a pulley 11 on the shaft supporting the polygon of mirrors by a belt 12. It is necessary that a rotating polygon of mirrors be utilized in this mechanism in order to impart the second dimension to a moving beam of light to produce a curve of light upon the viewing screen. If it were not for the rotating polygon of mirrors the path of light reflected onto the viewing screen by the light reflecting mirrors of the various vibration sensitive elements within the casing would merely amount to a straight line of light and no curve would be produced. The vibrations being measured, therefore, are responsible for moving the beam of light in one direction, while the rotating polygon of mirrors move the same beam in a second direction substantially at right angles to the first direction, whereby a path of light is projected onto the viewing screen which assumes the form of a substantially sinuous curve. The speed of rotation of the polygon of mirrors may be controlled by a rheostat 16 operated by means of a knob 21 on the outside of the instrument case. A contactor device 24 is mounted on the shaft 9 outside of the box, and connected in the electric circuit with the light bulb 17 in such a manner that the light may be flashed on when the arm 35 is in contact with the metal strip 25 on the worm 24, the arm 36 completing the circuit. By this means, a stationary film 142 (Fig. 15) may be subjected to a single exposure of the traversing light waves on the ground glass screen 7. In the preferred construction illustrated in Figures 1 to 3, the small motor 15 is an A. C. commutator type, the speed of which may be controlled by the variable resistance 16. The source of light 17 is preferably an incandescent lamp which provides, as nearly as possible, a source of light from a single point. The lamp is illuminated by current which also drives the motor 15 after being transformed by the transformer 18 which is connected by leads 19 (Fig. 3) to an outlet 20 on the control panel. The instrument may therefore be directly connected to a suitable source of electricity through a single plug which thereby supplies the current necessary to operate the oscillo-vibrograph.

The rays of light, after passing through the condensing lens 6, are reflected by the polygon of mirrors 5 onto a curved ground glass screen 7.

For most purposes the light from the lamp is a steady beam when the device is used in connection with visual observations of the viewing screen. When it is desired to photograph the various sinuous curves of light projected upon the viewing screen, an intermittent light source is preferable, so that only one reflection on the screen is photographed at a time, rather than repeated curves. This intermittent light feature, however, may be eliminated when a photograph is taken by a camera having a shutter adapted to allow exposure of the film only for the duration of one reflection of the rotating polygon of mirrors. Thus, it might be said that an intermittent light is used only for photographic purposes, while a constant or steady light is used for visual observations.

Since it is important to avoid all possibility of internal vibration, the rotating polygon of mirrors 5 is carefully balanced, while the motor 15 and transformer 18 are mounted upon vibration absorbing material 25 and 26, respectively. The control panel 1a, in addition to the rheostat control 27, has a light rheostat control 28, a push button 32 for controlling the electric circuit of the timing mechanism 4, dials 29 for adjusting the timing mechanism, a motor switch 30 in the motor control circuit and on the inside of the panel, a mounting for a small battery 31 providing the electric energy for the timing element 29. In order to hold the polygon of mirrors in fixed position, a pin 33 through the control panel 1a, may be slipped into an opening in the pulley 11. In using the oscillo-vibrograph it is frequently desirable to mount it directly upon the vibrating body, and provision is therefore made to attach it to the body whose vibrations are being analyzed. An illustrated type of attachment is angle irons 34 at each of the corners of the case 1. It will, of course, be obvious that other suitable fastening means may be employed, depending upon the character of the vibrating body, as will be apparent to those skilled in the art.

The oscillo-vibrograph instrument described above, when attached directly to a vibrating body, will transmit such vibrations as are present in the body directly to the seismic element 2, which will transmit such vibrations to the viewing screen 7. When the vibrograph is attached to such a body, wherein a plurality of vibrations are present such as a Diesel engine, and the vibrograph is attached, for instance, to the base of said engine to record vibrations present therein, it is also contemplated within the scope of this invention, as previously set forth in the specification, that another vibrating element of the same engine may be directly connected to the follow element 3, whereby transverse vibrations present in this second vibrating element may be recorded and transmitted to the same viewing screen 7.

Similarly, if vibrations are present due to a rotating element being worn or having a flat or irregular portion on the surface thereof, the same may be measured for direct comparison purposes by means of the torsional seismic element 3a which is adapted to transmit such vibrations to the viewing screen 7. Simultaneously the timing element 4 is adapted to transmit a standard time wave onto the viewing screen 7.

As a result of the construction and functions just described, it is obvious that three distinctly different vibrations of a unitary mechanism, all of which vibrations are directly related to each other, may be studied and viewed in their true relationship with respect to each other and in relation to a standard time curve, the amplitude and frequency of which are known, in order that these characteristics of the various vibrations being studied may be accurately determined. It will be seen that such a feature is desirable in studying the vibrations of any single given mechanism, for instance, where if the maximum amplitude of all three different vibrations occurs at the same moment, such a build-up of peak vibrations may result in serious damage either to the machine itself or to the surroundings. From such a study the relationship of the various maximum vibrations of the different vibrating elements may be readily determined and if it is found that they are occurring in such a way that their maximum movements are simultaneous, it may be possible to adjust or regulate one or several of the various elements so that the maximum vibrations will not occur simultaneously and thus not result in any serious damage to the machine.

Without the use of such an instrument as is embodied in the present application, such a determination of a plurality of vibrations in the same machine being studied could not be determined in their direct phase relationship to each other in a way such that the actual vibrating conditions of the machine could be determined in order to correct such defects as are necessary.

Figures 4, 5:
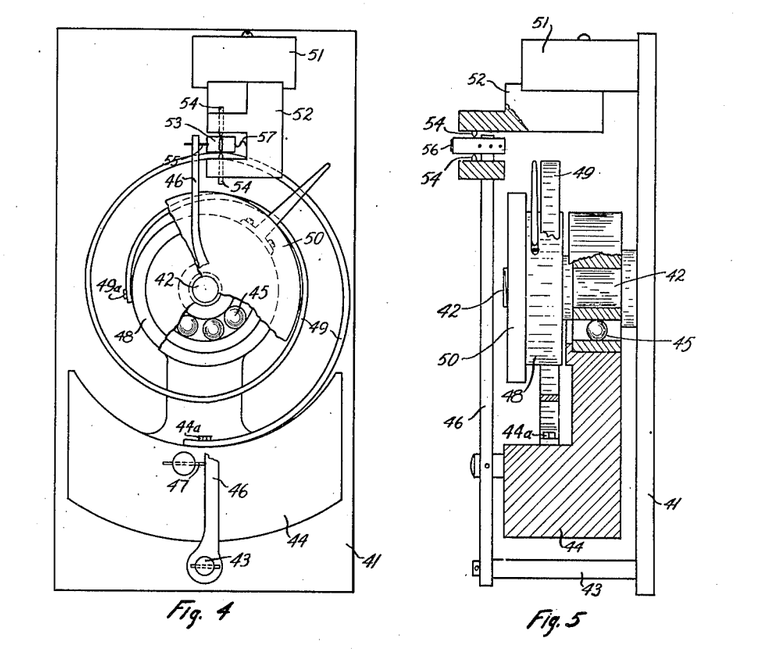
Figures 4 and 5 are front and side views respectively, the latter partly in section, of one of the seismic elements of the vibration instrument for indicating transverse vibrations.

The seismic element, designated generally as 2 in Figs. 1 to 3, is illustrated in greater detail in Figs. 4 and 5. It consists of a frame 41 having extensions 42 and 43. The extension 42 is a shaft upon which is mounted a weighted member 44 free to oscillate upon the shaft through a ball bearing assembly 45. A collar 48 mounted on the end of the shaft 42 opposite the base 41 serves to hold the weighted element 44 in position on the shaft and provides an anchorage 49a for the helical spring 49 which is attached at the other end to weighted element 44 at the point 44a. A lock nut 50 keeps the collar 48 in position. Also mounted on the base 41, but oppositely disposed from extension 43, is a block 51 to which is attached a second block 52 provided with a recess into which project pins 54 providing pivots for a block 53 on one end of which is mounted a small rectangular mirror 56. The block 53 is normally held in proper position by a small spring 57. The extension 43 provides a stationary pivot for a lever 46 extending from its pivot at 43 up to a pin 55 contacting with the block 56 at a side directly opposite the small spring 57. The lever 46 is caused to move by a pin 47 mounted near the bottom of weighted element 44 so that when the weighted element 44 oscillates with reference to the shaft 42, the lever 46 is caused to move in accordance with these vibrations and changes the direction in which the mirror 56 points.

Figure 6:
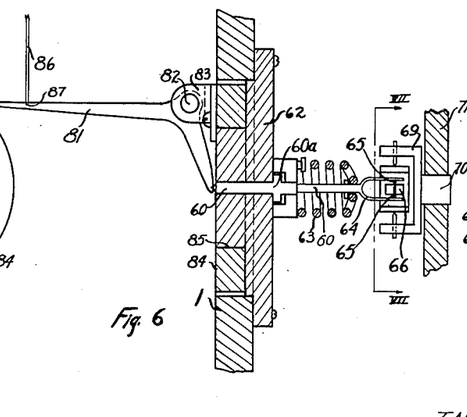
Figure 6 is a view of one of the direct indicating elements.
Figure 7:
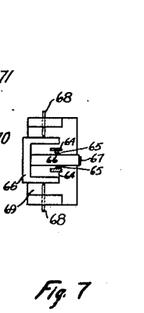
Figure 7 is a sectional view along the line VII—VII of Fig. 6.

Figures 6 and 7 illustrate, in connection with the follow mechanism, the direct indicating elements 3 which is employed both with the follow mechanism and also with the torsional element. The direct indicating element is attached to the side of the instrument case 1 by a base 62 provided with a circular boss 85. Both the base 62 and the circular boss 85 have an opening through which passes the shaft 60. The shaft 60 has a key or other projection 60a which prevents its being forced out through the opening when urged by the tension spring 63. At the interior end of the shaft 60 is a yoke 64 provided with pins 65 that contact with block 66 mounted in pivots 68 on the U-shaped member 69 held in position by an extension 70 into a supporting member 71 (Figs. 1 and 6) attached to the end of the instrument case. Movement imparted to the shaft 60 moves the block 66 and as a result alters the position of the rectangular mirror 67 directly in accord with movements of the shaft 60.

Figure 8:
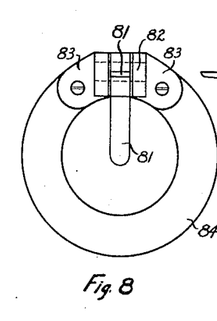
Figure 8 is a view of one of the transverse follow mechanisms which activates the direct indicating element shown in Figs. 6 and 7.

Also illustrated in Figure 6, as well as in Figure 8, is the follow mechanism 81. This comprises a ring 84 which slides over the circular boss 85 and is thereby attached to the instrument case. A bell crank lever 81 is pivoted on a shaft 82 attached to the ring 84 by lugs 83. The follow mechanism may be operatively connected with a vibrating body by means of a light rod 86 which contacts with the arm of the bell crank. Motion imparted to the rod 86 is communicated through the bell crank 81 to the rod 60, which thereby alters the position of the mirror 67. The rod 86 may be attached to the bell crank 81 at any distance located by center-punch marks 87 from the shaft 82, depending upon the degree of magnification of the motion desired. The ring 84 is readily removable from the side of the instrument case for safety in transportation as well as for permitting the use of the same position of the torsional element.

Figures 9, 21, 22:
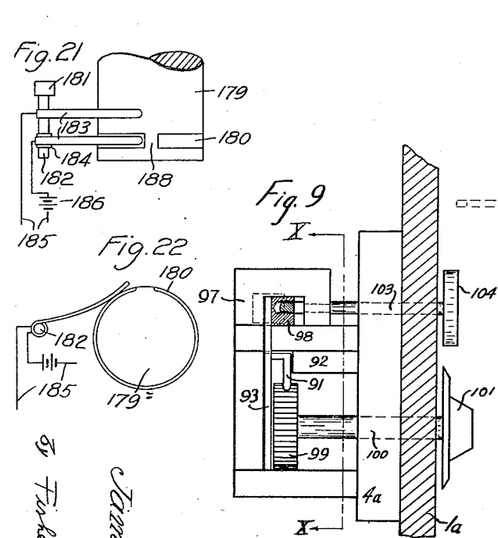
Figure 9 is an end view of one of the timing elements, looking in the same direction as in Fig. 3.
Figure 21 is a plan view of electrical contact mechanism of the timing element.
Figure 22 is an end elevation of said mechanism.
Figure 10:
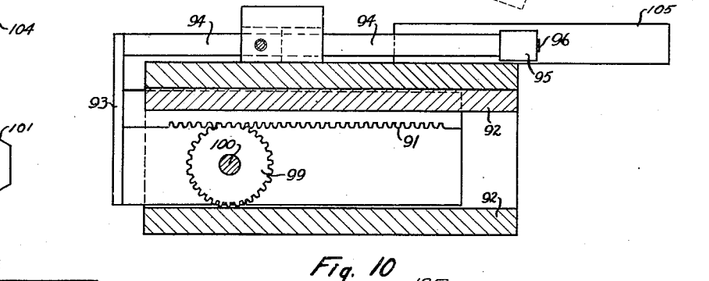
Figure 10 is a side view of the timing element shown in Fig. 9.
Figure 11:
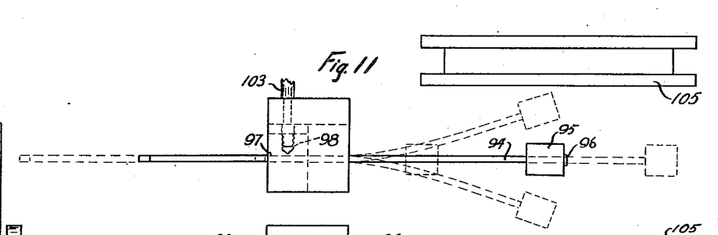
Figure 11 is a detail top view of the timing element.

Figures 9 to 11 illustrate in detail a preferred construction of the timing element, although other types of timing elements might be employed in the combination in place of the one herein illustrated. The timing element is mounted on the panel 1a of the instrument case and include a basic support 4a. A rack 91 supported in guides 92 carries member 93 to which is attached a projecting cantilever beam spring 94. At the outward end of the beam spring 94 is a weighted body 95 of magnetic material, on the end of which is mounted a small rectangular mirror 96. The beam spring 94 is carried in guides 97 and is clamped rigidly in position by a block 98. The gear wheel 99 engaging the rack 91, is on a shaft 100 extending through the support 4a and the instrument panel 1a to the outside of the case where a calibrated adjusting control dial 101 is attached. The clamping block 98 is operated by a screw 103, also extending to the outside of the instrument case where a knob 104 is provided. At one side of the cantilever beam spring 94 and weighted magnetic element 95 is an electromagnet 105 energized by the battery 31 (Fig. 3) under push button control 32 (Fig. 3).

Figure 12:
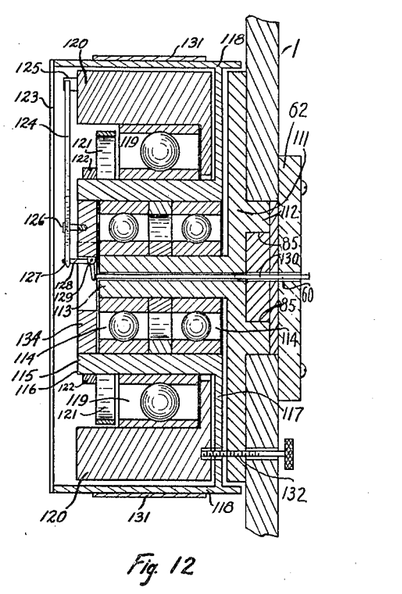
Figure 12 is a view in cross section of the torsional seismic mechanism which also activates the direct indicating element shown in Figures 6 and 7.
Figure 13:
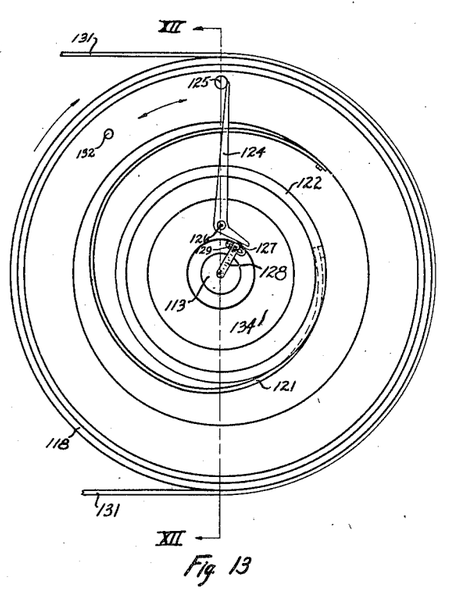
Figure 13 is a front view of the torsional seismic mechanism.

As stated above, the direct indicating mechanism or element 3 may be used not only with the follow mechanism shown in Figs. 6 and 8, but also with the torsional element illustrated in Figs. 12 and 13. It is also contemplated that the torsional element illustrated in Figs. 12 and 13 might be used at the same time the direct indicating element 3 is used with the follow mechanism described in Figs. 6 and 8. With this arrangement, duplicate structure such as that shown on the right hand side of the wall of casing 1 in Fig. 6 is provided in the casing between elements 3 and 23 as shown in Fig. 1. The follow mechanism such as shown by elements 81, etc., in Fig. 6, is used in connection with one set of direct indicating mechanism and the torsional seismic indicating mechanism shown in Figs. 12 and 13 is used in conjunction with the second set of direct indicating mechanism which is provided in the casing when both torsional seismic and direct contact vibrations are to be measured simultaneously. The base 111 of the torsional element is attached by a collar 112 to the side of the instrument case 1 by sliding over the circular boss 85 in the same manner that the disc 84 of the direct indicating mechanism was attached. This base member 111 has a shaft projection 113 on which is mounted the two rotating members of the torsional element. The tubular shaft 113 supports through a ball bearing race 114 a cylindrical shell 115 U-shaped in radial cross section consisting of an inner cylinder 116 and an outer cylinder 118. Within this shell and in contact with cylinder 116 is a ball bearing race 119 which carries a relatively heavy cylinder 120 which, due to its mounting in this fashion, is capable of rotation independently of the shell 115. The heavier cylinder 120, which acts as a seismic element, is kept in its proper relative position with respect to the cylinder 115 by means of a spiral spring 121, with adjustment plugs 122 by means of which it is attached to the cylinder 115. A face plate 123 extends over the cylinder 115 and is attached to the outer drum 118. Relative angular movement of the cylinder 120 and the shell 115 is transmitted by means of a bell crank lever 124 disposed in a radial direction from a pivot 126 on the ring 134 fixed in the bore of the cylinder 116. The radial extremity of the bell crank 124 contacts with a projection 125 on the heavier cylinder 120. Relative movement between the cylinder 120 and the U-shaped cylindrical shell 115 causes the bell crank 124 to rotate about the pivot 126. Also attached to the ring 134 is another bell crank lever 128 pivoted at the point 129. Movement of the bell crank lever 124 is thereby transmitted to the rod 130 through the center of the shaft projection 113 to the rod 60 (Figs. 6 and 12). Other means may also be employed for transferring the relative movement of cylinder 120 and shell 115 to rod 60, as will be evident. The torsional element attached, as has been noted, to the outside of the instrument case, is operated from the rotating subject of analysis by a belt 131 which should be flexible but substantially non-elastic, over the outside surface 118 of the cylindrical shell 115. To prevent rotation of the element, a threaded pin 132 may be provided for locking the cylindrical shell 120 and cylinder 115 to the base plate 111.

Figures 18, 19:
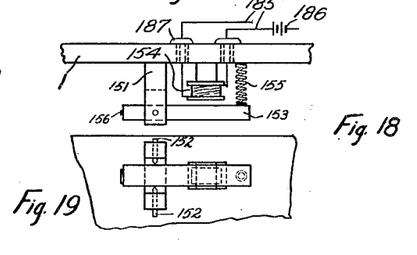
Figures 18 and 19 are top and side views respectively of the position indicator element.

To determine particular positions on a rotating body, a position indicator mechanism 23 (Figs. 1 and 3) and illustrated more particularly in Figs. 18 and 19, may be provided. This position indicator includes a block 151 attached to the side of the instrument case 1 and provided with a recess in which pins 152 extend to provide pivots for a member 153. At one end of member 153 is mounted a small rectangular mirror 156 facing in the direction of the source of light. At the opposite end is a spring 155 extending between the side of the case 1 and the member 153. This holds the member 153 in position. An electromagnet 154 is placed adjacent to the spring end of member 153 and when energized serves to attract it toward the magnet and thereby deflect the beam of light reflected by the mirror 156. The electromagnet 154 is energized by a suitable source of current through a circuit which includes, for example, a terminal on the rotating shaft of the external body and another fixed terminal with which the terminal on the shaft makes a contact once for every revolution. Normally the beam of light reflected by the mirror 156 is a straight line on the viewing screen, but when the shaft is rotated to the point of contact of the terminals, the energizing of the magnet 154 for a short interval causes a V to appear in the straight line and serves to indicate, in connection with the other curves in the viewing screen, the relative displacement with reference to the position of the terminal on the shaft.

The specific structure by which the position indicator mechanism 23 is actuated is shown in plan view in Fig. 21 and in end elevation in Fig. 22. In these figures the rotating shaft of the external body is shown at 179 and inserted near the outer end thereof and for nearly the full circumference is an insulating band 180. Mounted on a suitable support 181 is a horizontally projecting extension 182 adapted to support brushes 183. One brush is insulated from the support 182 by any suitable means 184. Leads 185 are connected to the brushes 183 which extend to opposite ends of the winding of electromagnet 154 shown in Fig. 18. Inserted in one of the leads is a suitable battery 186. The leads 185 extend through suitable insulating members 187 inserted through the wall of the case 1, such structure being clearly shown in Fig. 18. The brushes 183 are of resilient material whereby the same are held in constant contact with the rotating shaft 179. Since the shaft 179 is of electric conducting material, it will be readily seen that when the brush normally contacting with the insulating member 180 momentarily contacts the portion 188 of the shaft between the ends of the insulating material, a circuit will be completed through the brushes and correspondingly through the battery 186 and electromagnet 184. When such a circuit is momentarily completed the pivoted member 153 carrying the mirror 156 will be deflected for a brief instant, whereby a beam of light originating from the source 17 and projected onto the viewing screen 7, will be caused to assume a deviation, as shown at 176 in Fig. 17, from its normally straight path 175.

From the above, it will be evident that by locating the maximum point of vibration of the curve reflected by the torsional seismic mechanism on the viewing screen and by measuring the distance between such maximum point and the deflection 176, the location of the irregularity in the shaft may be determined by measuring in the proper direction from the point 188 on the shaft 179, which is the shaft being studied.

When it is desired to secure a permanent record of the curves projected onto the viewing screen, a suitable camera may be employed. Such a camera is illustrated in Figs. 14 and 15 and includes a box 141 which may be placed over the ground glass screen supporting structure 39 (Fig. 2) and encloses a sensitized film 142 supported between two spools 143 and guide rollers 144 over a plate 145. The plate 145 disposed laterally on the guideways 146 carries a narrow slot 147 in the plane of the curve. The slot 147 when moved across the ground glass screen 7 (Fig. 2) exposes the film 142 in the path of the light beams. An alternate construction is the use of the contactor device 24 (Fig. 1) and removing the plate 145, by which means a stationary film 142 may be subjected to a single exposure of the traversing light waves during a short period in which the light bulb 17 (Fig. 1) is energized by electric current. A synchronously moving film may be utilized to obtain a continuous photograph of transient vibration phenomena either by locking the polygon of mirrors 5 in position or allowing them to rotate at a uniform rate of speed.

Figure 16:
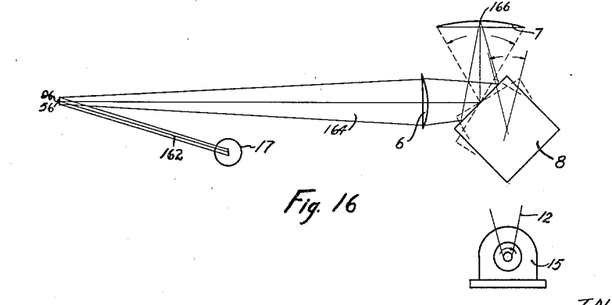
Figures 16 and 17 are diagrammatic showings of the optical system for illustrating the means by which the torsional or transverse vibrations are projected onto the viewing screen.
Figure 17:
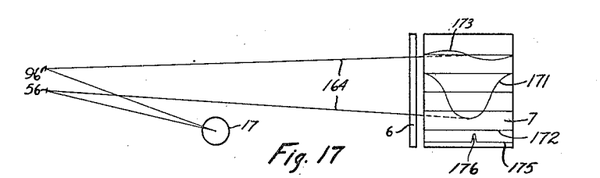

Referring to the diagrammatic Figs. 16 and 17, the small rectangular mirror 56 (operated by the seismic element designated generally as 2 in Figs. 1 to 3) reflects a beam of light 162 from the straight filament lamp 17 as a long narrow column of light 164. The cylindrical condensing lens 6 reduces the column of light 164 to a focal point 166 on the ground glass screen 7. Oscillation of the seismic element supporting the mirror 56 causes the beam of light 164 to travel up and down (i. e. across) the condensing lens 165 and the spot of light 166 moves back and forth across the ground glass screen 7. Rotation of the polygon of mirrors 8, interposed between the condensing lens 6 and the ground glass screen 7 by means of a motor 15, causes the spot of light 166 to describe a curve such as the sine curve 171 illustrated. Until the speed of rotation of the mirrors is adjusted in accordance with the frequency of the vibration, the curve will vary in position and it is therefore necessary to adjust the speed of the motor 15 by means of the rheostat control knob 27 until the curve remains stationary, when it may be readily observed. The amplitude calibration (obtained as hereinafter described) is marked by lines 172 drawn on the ground glass screen and from these lines the amplitude of the vibration may be ascertained. A second curve 173 produced by the timing element 4 is adjusted to become stationary on the screen by changing the length of the vibrating beam spring 94 until the natural frequency coincides with the seismic element frequency. The calibrated dial 101 on the timing element adjusting screw indicates the frequency of the stationary waves of light. The shape of the curve 171 on the ground glass screen is determined by the characteristics of the vibration phenomena under investigation. The oscillation of the seismic element which is proportional to the space-time movements or induced lateral vibrations directly registers on the screen a curve similar to the sine and its harmonics.

The direct indicating elements, Figs. 6 and 7, activated by the follow mechanism, Figs. 8 and/or by the torsional seismic mechanism, Figs. 12 and 13, produce in the same manner sine wave curves proportional to the frequency and the amplitude of the laterally vibrating bodies and torsional vibrating bodies, respectively.

A curve 175 is projected onto the screen by the position indicator element 23 which when operated by completing its electric circuit produces a V-shaped break 176 in the curve 175 and indicates whether the contact on the shaft is at the position of greatest amplitude of vibration or not. The contact can, of course, be varied as desired.

The oscillo-vibrograph of the present invention may be readily calibrated through the use of a vibrating platform driven by an eccentric on a counter shaft. The platform supported at four points upon flat springs should be capable of lateral movement in one direction only. The eccentric element may be one comprising two eccentric cylinders which can be adjusted by shifting the position of the outer cylinder relative to the inner cylinder for any eccentricity from zero to about 0.005 inch. The platform, by rotation of the eccentric body, may be thus constrained to move with sinusoidal motion over the same range of amplitudes. Movements of the platform are indicated by a dial gauge measuring displacements in thousandths inches. Changing the speed of the counter shaft carrying the eccentric cylinders will vary the frequency of vibration. In calibrating, for example, the seismic element 2, the oscillo-vibrograph as a whole is placed upon and rigidly attached to the platform which is caused to vibrate through known amplitudes and known frequencies. By varying the amplitude several lines 172 of known values may be drawn upon the ground glass viewing screen 7, whereby direct readings may be made. With a seismic element having a natural frequency of 250 cycles per minute, vibration frequencies may be measured ranging from 400 to 5,000 cycles per minute at a magnification up to 500 times. Magnifications ranging from 200 to 1,000 times may be obtained by suitable adjustment.

The direct follow element is similarly calibrated except that the oscillo-vibrograph is placed upon a stable foundation adjacent the vibrating platform and contacted therewith through a light rigid rod as, for example, 86 shown in Fig. 6. The direct follow element will indicate and record frequencies as low as 300 cycles per minute while the upper limit of observation may be far up in the noise range using, if necessary, partial waves for examination. Frequencies near 300 cycles per second are recorded with a magnification of about 500 times.

The range of frequencies of the torsional element is between 300 and 4,000 cycles per minute, with magnifications of the torsional movement from 50 to 500 times.

The vibrating beam spring of the timing element would, for normal use, be constructed for a frequency range of from 300 to 3,600 cycles per minute. However, by placing a lesser amount of weight on the beam, the frequency range may be extended to correspond to the maximum frequency obtained by the other elements.

The oscillo-vibrograph will visually indicate amplitude, wave form, and frequency of transverse and torsional vibrations, with a high degree of magnification and accuracy. An instrument light in weight, small in size, and readily portable is obtained, having a wide range of application in the analysis of the general vibration problems encountered in the laboratory and in the industrial field. It may be regarded as a convenient tool which will present the record of a vibration in its simplest form for immediate scientific analysis.

The oscillo-vibrograph is used in the measurement of linear or torsional vibrations to produce waves of light on the viewing screen proportional to the vibration. As stated above, the instrument may be employed in connection with the measurement of vibrations in a body of considerable size. In this instance, involving the use of the seismic element 2 for indicating transverse vibrations, the instrument is placed securely upon the vibrating body. The power cord, plugged into an electrical outlet, delivers electricity to the transformer for the motor and lamp and the intensity of the light is adjusted by means of the rheostat 28. The maximum amplitude of the vibrating movement is indicated by a line of light on the viewing screen. By switching on the motor control switch 30, the polygon of mirrors is rotated and the speed controlled by the rheostat 16 through control knob 27 until the curve of light moving across the screen becomes stationary. This adjustment of the motor speed is usually readily accomplished and when the wave maintains a constant position its characteristics may be noted. The amplitudes of the fundamental wave and such harmonics as exist are measured on the calibrated lines 172 on the screen 7. To determine the frequency of the wave the clamping screw 104 of the timing element is loosened and the dial control 101 and the clamping screw of the beam spring adjusted until its vibration produces a stationary sine curve on the screen beside the forced vibration wave. The timing wave element is displaced and released by the electromagnet 105 under push button control 32. The reeading of the calibrated dial on the panel of the instrument gives the frequency of the measured vibration. If the frequency of the vibration is known, continuous observations of the vibration phenomena may be made without reference to the timing element.

When the shaft 42 (Figs. 4 and 5) of the seismic element is placed at right angles to the shaft whose vibration is under analysis, the instrument will indicate thrust vibration. If it is desired to measure lateral movements at right angles to the axis of the shaft, the shaft 42 of the seismic element is placed parallel thereto or if vertical vibration of the shaft is under consideration the instrument case is placed on its side with the control panel on top and the viewing screen in a vertical position. The seismic element 44 is then adjusted to its normal position by changing the tension of the spiral spring 49 on the pendulum weight. A steel plate may be bolted to the vibrating object to form a support for the instrument.

The direct follow element 81 (Figs. 6 and 8) of the oscillo-vibrograph is used in the measurement of vibrations where the seismic element may not be conveniently applied but in this case the instrument is mounted rigidly upon any suitable foundation not subject to the vibrations of the machine. One end of a light adjustable rod is placed against the vibrating body and the other is connected with a punch mark on the bell crank 87 of the follow mechanism. The rod is adjusted to center the movement of the spot of light on the viewing screen. If the amplitude is relatively small, the rod is shifted at the bell crank to an intermediate position to obtain greater magnification, when the wave formed may be readily observed, its frequency noted through the use of the timing element, and the amplitude noted by the calibrations on the viewing screen.

Where the instrument is to record the angular movement of, for example, a reciprocating engine, a belt 131 (Figs. 12 and 13) is arranged to extend around the engine shaft and the pulley drum 118 of the torsional element. Variations in the angular velocity of the shaft are transmitted through the belt to the element and the trace of the light wave on the viewing screen is presented for analysis.

The more general problems involved in vibration analysis are those concerning the balancing of rotating apparatus, and the critical or resonant conditions in machines and structure. Problems of this nature are usually recognized without great difficulty, although their correction is not ordinarily undertaken without a complete analysis of the vibration in order to avoid the needless expense of a procedure not fundamentally sound. Many other problems in vibration are not so common, and the substitution of an instrument analysis for the "trial and error" method of experience, in most cases, is favorably comparable in cost and time with machine balancing, and the hand-balancing of former days.

Some of the types of vibration in structures of less frequent occurrence, but, nevertheless, of considerable importance, which may be analyzed by the oscillo-vibrograph of this invention are these: In rotating equipment, shaft roughness, such as a bump or a flat spot on the journal, a coupling misalignment or improper machine fit, a looseness or shifting of parts in the rotor body, a double frequency condition, due to larger single keyways, or a triple or higher frequency vibration of continuous shafts upon multiple supports; in electric power machines, the mechanical vibration of the bearing pedestals, the rotor, or the frame, and the magnetic vibrations of the frame and allied structures; the vibrations in steam turbines, in the bearing pedestals, the cylinders, and the auxiliary equipment; the vibrations of machine foundations, and buildings, and bridges; in engine vibrations, the reciprocating and rotating unbalances; the torsional and lateral vibrations of automobile, Diesel, and aircraft engines; the guaranty of operation of machines within certain vibration limits; and the noise and high frequency vibrations of small amplitude in machines which is so objectionable in their operation. These problems require for their solution the scientific methods of complete and systematic analysis.

The oscillo-vibrograph of the present invention may be used to observe vibrations of a nonperiodic nature or of a damping type. Nonperiodic vibrations are sometimes obtained under impact conditions and the damped type observed in the "bumping" test of a structure to obtain its natural period of vibration. These records may be made by placing a small film over the viewing screen or driving a travelling film by the same motor that ordinarily rotates the mirrors. The mirrors are locked in position to reflect the beam or beams of light in a line at the middle of the screen. Instead of using a camera for recording curves on the viewing screen, it is usually possible when the rotating mirrors are in operation and synchronized, to make tracings of the light wave on a transparent paper placed on the screen.

An example of the application of the oscillo-vibrograph in the solution of a field balancing problem will be considered to illustrate the principles involved in the scientific method of complete and systematic analysis of vibration.

Given a revolving element—for convenience, that of an electric motor—revolving in its own bearings at its location of service: Assume that it vibrates to such an extent that its operation is objectionable. The machine is operated at normal speed, and the oscillo-vibrograph is placed on the bearing pedestals. From an observation of the vibration waves, it is found that the lateral movement of the pedestals is sinusoidal in character, and the frequency corresponds to the rotational speed of the rotor. The amount of the total movement of the collector and pedestal is 0.0045 inch, and the coupling end pedestal 0.0056 inch. It is suggested immediately, from the shape of the wave, and the frequency, that the machine is presumably out of balance.

The machine is then stopped, and the balance ring at each end of the rotor is marked at 90° positions. Two equal weights, (for example, 16 ounces each), sufficient in size to disturb the balance of the rotor, are then placed in the balance rings, one at each end in correspondingly marked positions. The rotor is revolved at normal speed, and the movements of the two pedestals are recorded. The two weights are then shifted 90° around the balance rings in the same direction, and the vibration again measured. A second shift of the weights to a third position determines another set of pedestal movements. The test data may be tabulated as in Table 1.

TABLE 1

*Vibration data*

| Run no. | Weight positions | Total movements in collector end (A) | Thousandths inch coupling end (B) |
|---|---|---|---|
| | *Degrees* | | |
| 1 | | 4.5 | 5.6 |
| 2 | 0 | 8.9 | 9.3 |
| 3 | 90 | 5.0 | 7.6 |
| 4 | 180 | 1.3 | 2.7 |

Figure 20:
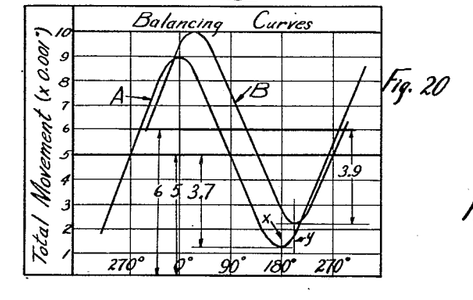
Figure 20 is a graph showing a step in the solution of a typical vibration problem.

Two sine curves, A and B Fig. 20, may be drawn on cross-section paper for the movements of the two ends of the rotor using the three recorded movements at the 90° weight positions, since the fourth point would be fixed by the graph without the necessity of a trial run. The lowest points on the curves indicate the required location of the balancing weights, and the amount of weight to add is proportionally greater or less than the original balance weights, as the ratio of the ordinate of the median line of the sine curve is to the amplitude of the curve. The weight to be added to the collector end balance ring at point X is $$16 \times \frac{5}{3.7} = 21.6 \text{ ounces}$$

and the weight for the coupling end at the point Y is $$16 \times \frac{6}{3.9} = 24.6 \text{ ounces}$$

After placing the above balance weights at the indicated positions, the rotor is presumably balanced, and should operate with no vibration. However, if the data does not appear to conform to a sinusoidal variation, or if the final weights do not effect a balance, it is certain that an unbalance difficulty is not the source of the trouble. In such a case, a negative result is as valuable as one that is positive, for only a short time is required to make the four runs necessary, and otherwise, a balancing procedure of many days duration may be followed without success.

The foregoing description of a preferred embodiment of my invention will suggest many modifications to those familiar with this type of apparatus but these modifications should be considered as within the scope of my invention.

I claim:

1. A vibration indicating and analyzing instrument adapted to simultaneously measure a plurality of different vibrations of a single machine for purposes of comparison, comprising a case adapted to be rigidly secured to a portion of a machine, the vibration characteristics of which are to be studied, a seismic mechanism movably mounted in said case and responsive to transverse vibrations thereof, a directly connected follow mechanism adapted to be connected to another portion of said machine and movable relative to said case to be responsive to relative movements between said portions, a vibrating timing mechanism, each of said three mechanisms being provided with a light reflecting means; a light source, a rotatable polygon of mirrors, a viewing screen, means provided on said case whereby the same may be anchored directly on a machine, the vibrations of which are to be studied, the vibrations imparted to said various mechanisms causing said light reflecting means carried by each to oscillate, whereby light from said light source is reflected therefrom onto said rotatable polygon of mirrors and thence to said viewing screen whereby the plurality of light curves thus formed may be directly compared in their true relationship to each other as they exist in said single machine being studied.

2. The combination as claimed in claim 1, including position indicating mechanism comprising a light reflecting surface mounted on a pivoted member and provided with means whereby it is adapted to be deflected slightly at designated intervals in the movement of a rotating portion of said machine whereby light from said light source is normally reflected by said surface in a straight line but when deflected momentarily causes a deflection in said light path on said viewing screen.

3. The combinations as claimed in claim 1, wherein said vibrating timing mechanism is adapted to be adjusted by means including a calibrated scale whereby the light reflected from said timing mechanism may be regulated to assume the same characteristic curve of any others on the viewing screen whereby the frequency thereof may be directly read from said scale.

4. A vibration indicating and analyzing instrument adapted to simultaneously measure a plurality of different vibrations of a single machine for purposes of comparison, comprising a case adapted to be rigidly secured to a portion of a machine, the vibration characteristics of which are to be studied, a seismic mechanism movably mounted in said case and responsive to transverse vibrations thereof, a torsional seismic mechanism adapted to be connected to another portion of said machine and movable relative to said case to be responsive to vibrations present in a rotating part of said machine, a vibrating timing mechanism, each of said three mechanisms being provided with a light reflecting means; a light source, a rotatable polygon of mirrors, a viewing screen, means provided on said case whereby the same may be anchored directly on a machine, the vibrations of which are to be studied, the vibrations imparted to said various mechanisms causing said light reflecting means carried by each to oscillate, whereby light from said light source is reflected therefrom onto said rotatable polygon of mirrors and thence to said viewing screen whereby the plurality of light curves thus formed may be directly compared in their true relationship to each other as they exist in said single machine being studied.

5. The combination as claimed in claim 4, including position indicating mechanism comprising a light reflecting surface mounted on a pivoted member and provided with means whereby it is adapted to be deflected slightly at designated intervals in the movement of said rotating part of said machine whereby light from said light source is normally reflected by said surface in a straight line but when deflected momentarily causes a deflection in said light path on said viewing screen.

6. A vibration indicating and analyzing instrument adapted to simultaneously measure a plurality of different vibrations of a single machine for purposes of comparison, comprising a case adapted to be rigidly secured to a portion of a machine, the vibration characteristics of which are to be studied, a torsional seismic mechanism mounted in said case adapted to be connected to another portion of said machine having a surface moving in a curved path, a directly connected follow mechanism adapted to be connected to still another portion of said machine, said last two mechanisms being movable relative to said case to be responsive to vibrations occurring in said respective portions to which they are connected, a vibrating timing mechanism, each of said three mechanisms being provided with a light reflecting means; a light source, a rotatable polygon of mirrors, a viewing screen, means provided on said case whereby the same may be anchored directly on a machine, the vibrations of which are to be studied, the vibrations imparted to said various mechanisms causing said light reflecting means carried by each to oscillate, whereby light from said light source is reflected therefrom onto said rotatable polygon of mirrors and thence to said viewing screen whereby the plurality of light curves thus formed may be directly compared in their true relationship to each other as they exist in said single machine being studied.

7. The combination as claimed in claim 6, including position indicating mechanism comprising a light reflecting surface mounted on a pivoted member and provided with means whereby it is adapted to be deflected slightly at designated intervals in the movement of that portion of said machine having a surface moving in a curved path whereby light from said light source is normally reflected by said surface in a straight line but when deflected momentarily causes a deflection in said light path on said viewing screen.

8. A vibration indicating and analyzing instrument adapted to simultaneously measure a plurality of different vibrations of a single machine for purposes of comparison, comprising a case adapted to be rigidly secured to a portion of a machine, the vibration characteristics of which are to be studied, a seismic mechanism movably mounted in said case and responsive to transverse vibrations thereof, a directly connected follow mechanism adapted to be connected to another portion of said machine and movable relative to said case to be responsive to relative movements between said portions, a torsional seismic mechanism adapted to be connected to still another portion of said machine adapted to have a portion thereof moved in a curved path and movable relative to said case to be responsive to vibrations of a torsional nature in said last mentioned portion, a vibrating timing mechanism, each of said three mechanisms being provided with a light reflecting means; a light source, a rotatable polygon of mirrors, a viewing screen, means provided on said case whereby the same may be anchored directly on a machine, the vibrations of which are to be studied, the vibrations imparted to said various mechanisms causing said light reflecting means carried by each to oscillate, whereby light from said light source is reflected therefrom onto said rotatable polygon of mirrors and thence to said viewing screen whereby the plurality of light curves thus formed may be directly compared in their true relationship to each other as they exist in said single machine being studied.

9. The combination as claimed in claim 8, including position indicating mechanism comprising a light reflecting surface mounted on a pivoted member and provided with means whereby it is adapted to be deflected slightly at designated intervals in the movement of that portion of said machine having a surface moving in a curved path whereby light from said light source is normally reflected by said surface in a straight line but when deflected momentarily causes a deflection in said light path on said viewing screen.

10. A vibration indicating and analyzing instrument comprising a vibration sensitive light reflecting surface adapted to be oscillated in response to vibrations imposed thereon, a timing means including another light reflecting surface adapted to be oscillated at predetermined frequencies, said timing means including an adjustable means comprising a frequency indicating scale and adapted to adjust the oscillations of said surface to a predetermined frequency; a viewing screen and a source of light, whereby paths of light reflected by said plurality of reflecting surfaces may be simultaneously viewed on said screen, said adjustable means permitting the path from one reflecting surface to be synchronized with any other path on said viewing screen and said scale permitting the ready reading of the frequency of the path from said adjustable reflecting surface, which reading, when its path is coinciding with any other path, will also indicate the frequency of said other path.

JAMES JAY RYAN.

CERTIFICATE OF CORRECTION.

Patent No. 2,136,759. November 15, 1938.

JAMES JAY RYAN.

It is hereby certified that error appears in the printed specification of the above numbered patent requiring correction as follows: Page 4, first column, line 53, for "folow" read follow; and second column, line 39, beginning with the words "For most purposes" strike out all to and including the word and period "observations.", line 55, and insert this paragraph before "The rays of" in line 36; page 5, second column, line 25-26, for "elements" read element; line 70, for "include" read includes; page 6, first column, lines 56 and 57 respectively, before "cylinder" insert U-shaped; page 7, second column, line 4, for "Figs. 8" read Fig. 8; page 8, first column, line 43, for "reeading" read reading; and second column, line 21, for "structure" read structures; page 9, second column, line 57, claim 3, for "combinations" read combination; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.